United States Patent
Fukumoto et al.

(10) Patent No.: US 6,378,251 B2
(45) Date of Patent: *Apr. 30, 2002

(54) DOOR LOCKING ASSEMBLY FOR A VEHICLE AND A DOOR ASSEMBLY HAVING THE SAME

(75) Inventors: Ryoichi Fukumoto, Nagoya; Motohiro Kokubo, Kariya; Masayuki Uchitsunemi, Chiryu; Keiichi Fukushima, Toyota; Hiroshi Takai, Okazaki; Daiichi Shiraishi, Seto, all of (JP)

(73) Assignees: Aisin Seiki Kabushiki Kaisha, Kariya; Toyota Jidosha Kabushiki Kaisha, Toyota, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,852

(22) Filed: Aug. 31, 1999

(30) Foreign Application Priority Data

Aug. 31, 1998 (JP) ............................................. 10-244974

(51) Int. Cl.⁷ ................................................ E06B 3/00
(52) U.S. Cl. ............................ 49/503; 90/237; 90/264; 90/370
(58) Field of Search ...................... 49/502, 503; 70/237, 70/264, 370

(56) References Cited

U.S. PATENT DOCUMENTS

| 5,095,659 A | * | 3/1992 | Benoit ....................... 49/503 X |
| 5,224,364 A | * | 7/1993 | Claar et al. ......... 70/DIG. 30 X |
| 5,316,364 A | * | 5/1994 | Ohya ......................... 49/503 X |
| 5,377,450 A | * | 1/1995 | Varajon ..................... 49/503 X |
| 5,902,004 A | * | 5/1999 | Waltz et al. ............... 49/503 X |
| 5,904,002 A | * | 5/1999 | Emerling et al. .......... 49/503 X |

FOREIGN PATENT DOCUMENTS

| JP | 5-201252 | 8/1993 |
| JP | 7-17248 | 1/1995 |

* cited by examiner

*Primary Examiner*—Jerry Redman
(74) *Attorney, Agent, or Firm*—Burns, Doane, Swecker & Mathis, LLP

(57) ABSTRACT

A door assembly for vehicles includes a space defined between a door inner panel and a door trimming, in which a door locking device for holding a vehicle door on a vehicle body is accommodated so as to be secured on the door inner panel. A key cylinder and a connecting rod for a door outside handle are arranged between a door outer panel and the door inner panel, and a locking lever and an opening lever of the door locking device are placed in the space connected to the key cylinder and the connecting rod.

8 Claims, 10 Drawing Sheets

DOOR LOCKING ASSEMBLY FOR A VEHICLE AND A DOOR ASSEMBLY HAVING THE SAME

BACKGROUND OF THE INVENTION

The present invention relates to a door locking assembly for a vehicle for operating a door locking device capable of holding a vehicle door assembly on a vehicle body, and to a vehicular door having the door locking assembly.

In a prior art of this kind, a door locking assembly for vehicles is disclosed in Japanese Patent Laid-Open Publication No. 7-17248 (1995), and a vehicular door assembly is disclosed in Japanese Patent Laid-Open Publication No. 5-201252 (1993).

In the former system of the prior art, a door key cylinder to lock a door assembly with respect to a vehicle body is supported by a door outer panel. The door key cylinder is supported not only by a door outer panel but also by a stay fixed on the door outer panel so that it may be supported at its two ends. On the other hand, a door locking device to be associated with the door key cylinder is arranged between the door outer panel and a door inner panel, and the door key cylinder is associated with the door locking device by a connection rod which is arranged between the door outer panel and the door inner panel. In fact, the door assembly is normally composed of the door outer panel, the door inner panel, and a door trim which are connected to each other.

In the latter device of the prior art, on the other hand, the door locking device is supported by the door inner panel. The door locking device is fixed on the face of the door inner panel on the inner side of a vehicle compartment and is covered with the door trimming. On the other hand, the weather strip is fixed on the door trimming, and a seal between the vehicle door and the vehicle body is provided by causing the weather strip to contact with the vehicle body.

According to the former system of the prior art, however, the stay is required for supporting the door key cylinder thereby to increase the number of parts. Since the door locking device is interposed between the door inner panel and the door outer panel and since a connection rod for associating the door locking device and the door key cylinder device is interposed between the door inner panel and the door outer panel, on the other hand, the connection rod and/or the door locking device may be unlawfully operated along the windshield of the vehicle door from the vehicle door on the outer side of the vehicle compartment.

Since the door locking device is interposed between the door inner panel and the door trimming, according to the latter device of the prior art, the door locking device is hardly operated unlawfully. However, there has never been proposed such a connection structure between the door key cylinder and the door locking device as is effective for the unlawful operation. In the latter device of the prior art, on the other hand, the weather strip for providing the seal between the vehicle door and the vehicle body is fixed on the door trimming to contact with the door trimming and the vehicle body. As a result, the sealing force may be reduced if the door trimming is deformed due to its thermal shrinkage or aging.

SUMMARY OF THE INVENTION

It is, therefore, an object of the invention to provide a door locking assembly for a vehicle, which is improved in an anti-lawful operation by improving the connection structure between a door locking device and a door key cylinder, and a vehicle door assembly having the vehicular door locking assembly.

In order to achieve the above-specified object, according to a first aspect of the invention, there is provided a door locking assembly for a vehicle comprising: a door locking device adapted to be fixed on the face of a door inner panel of a vehicle door on the inner side of a vehicle compartment and including a locking member and an open member; and a door key cylinder adapted to be so arranged on the face of a door outer panel of said vehicle door on the outer side of the vehicle compartment as to be supported by said door outer panel and said door inner panel and so extended through said door inner panel as to be associated with the locking member of said door locking device.

According to this first aspect, the door key cylinder is supported at its two ends by the door outer panel and the door inner panel. Unlike the prior art, therefore, the stay is not required to reduce the number of parts. On the other hand, the door locking device is arranged at the door inner panel on the inner side of the vehicle compartment, and the door locking device and the door key cylinder are connected at the door inner panel on the inner side of the vehicle compartment. As a result, an anti-lawful operation can be improved better than the prior art.

Preferably, the vehicular door locking assembly may further comprise a first connection rod arranged at said door inner panel on the inner side of the vehicle compartment and connected to the locking member and the door key cylinder of said door locking device.

In order to achieve the aforementioned object, according to a second aspect of the invention, there is provided a door assembly for a vehicle comprising: a door outer panel for providing the external appearance of a vehicle door on the outer side of a vehicle compartment; a door inner panel fixed on the face of said door outer panel on the inner side of the vehicle compartment; a door trimming fixed on the face of said door inner panel on the inner side of the vehicle compartment for providing the external appearance of the vehicle door on the inner side of the vehicle compartment; a door locking device fixed on the face of said door inner panel on the inner side of the vehicle compartment and arranged in a space between said door inner panel and said door trimming for holding said vehicle door on the vehicle body; and a weather strip contacting with said door inner panel and said vehicle body for providing a seal between said vehicle door and said vehicle body.

According to this second aspect, the door locking device is arranged at the door inner panel on the inner side of the vehicle compartment so that it can be connected at the door inner panel on the inner side of the vehicle compartment to the door key cylinder for operating it. As a result, an anti-lawful operation can be improved better than the prior art. On the other hand, the weather strip contacts with the door inner panel and the vehicle body so that it is not influenced by the deformation or the like of the door trimming but can ensure the seal between the vehicle body and the vehicle door.

Preferably, the vehicular door assembly may further comprise a door key cylinder supported by said door outer panel and said door inner panel and associated with a locking member of said door locking device.

DESCRIPTION OF THE PREFERRED EMBODIMENT

Figure 1:
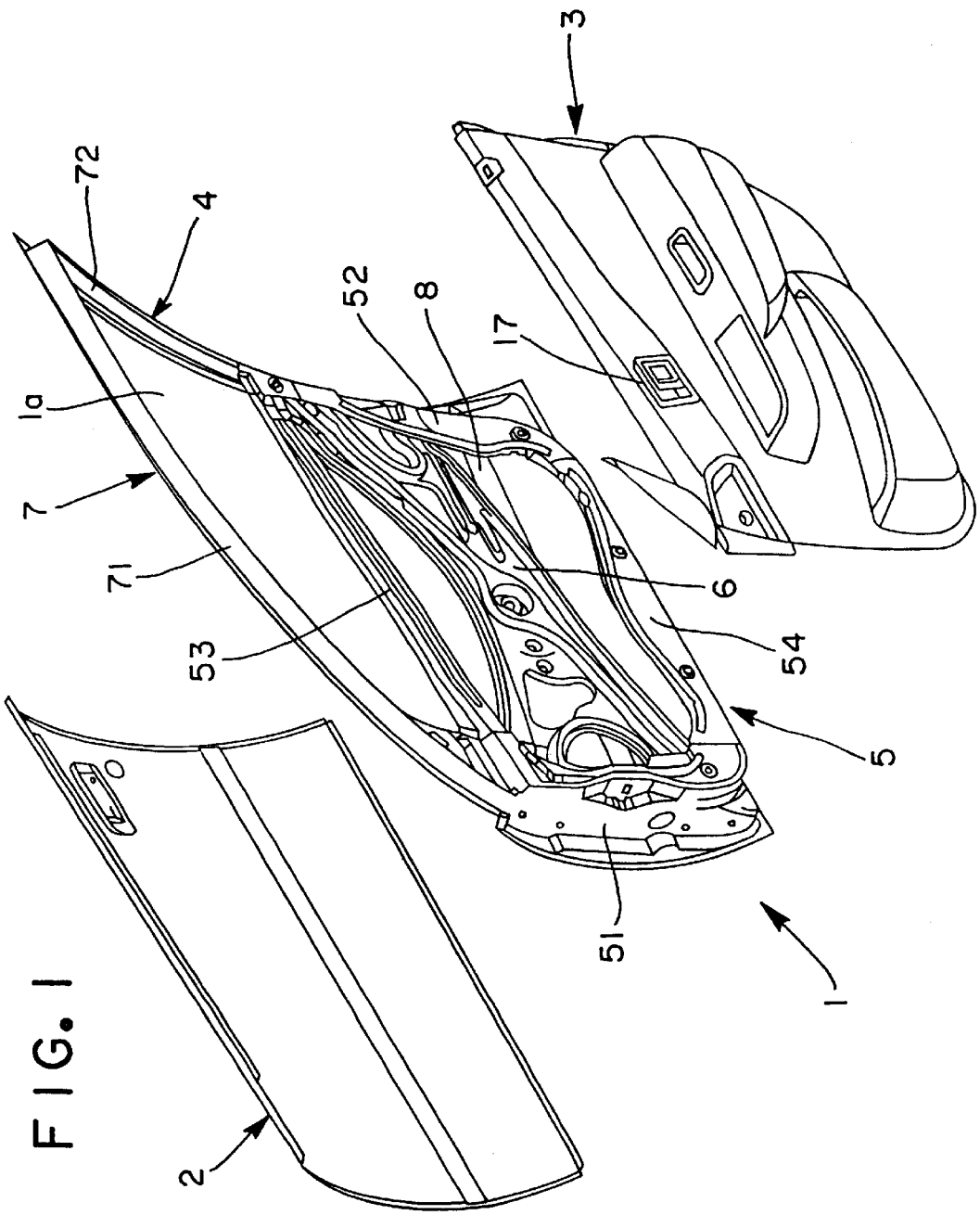
FIG. 1 is an exploded perspective view of a vehicular door according to the invention.

As shown in FIG. 1, a car door 1 is constructed to include: a door outer panel 2 disposed on the outer side of a car compartment for providing the external appearance of the car door 1 on the outer side of the car compartment; a door trimming 3 disposed on the inner side of the car compartment for providing the internal appearance of the car door 1 on the inner side of the car compartment; and an inner module 4 for providing the skeleton of the car door 1. The inner module 4 is arranged between the door outer panel 2 and the door trimming 3 for supporting the door trimming 3 at its face on the inner side of the car compartment and the door outer panel 2 at its face on the outer side of the car compartment.

Figure 2:
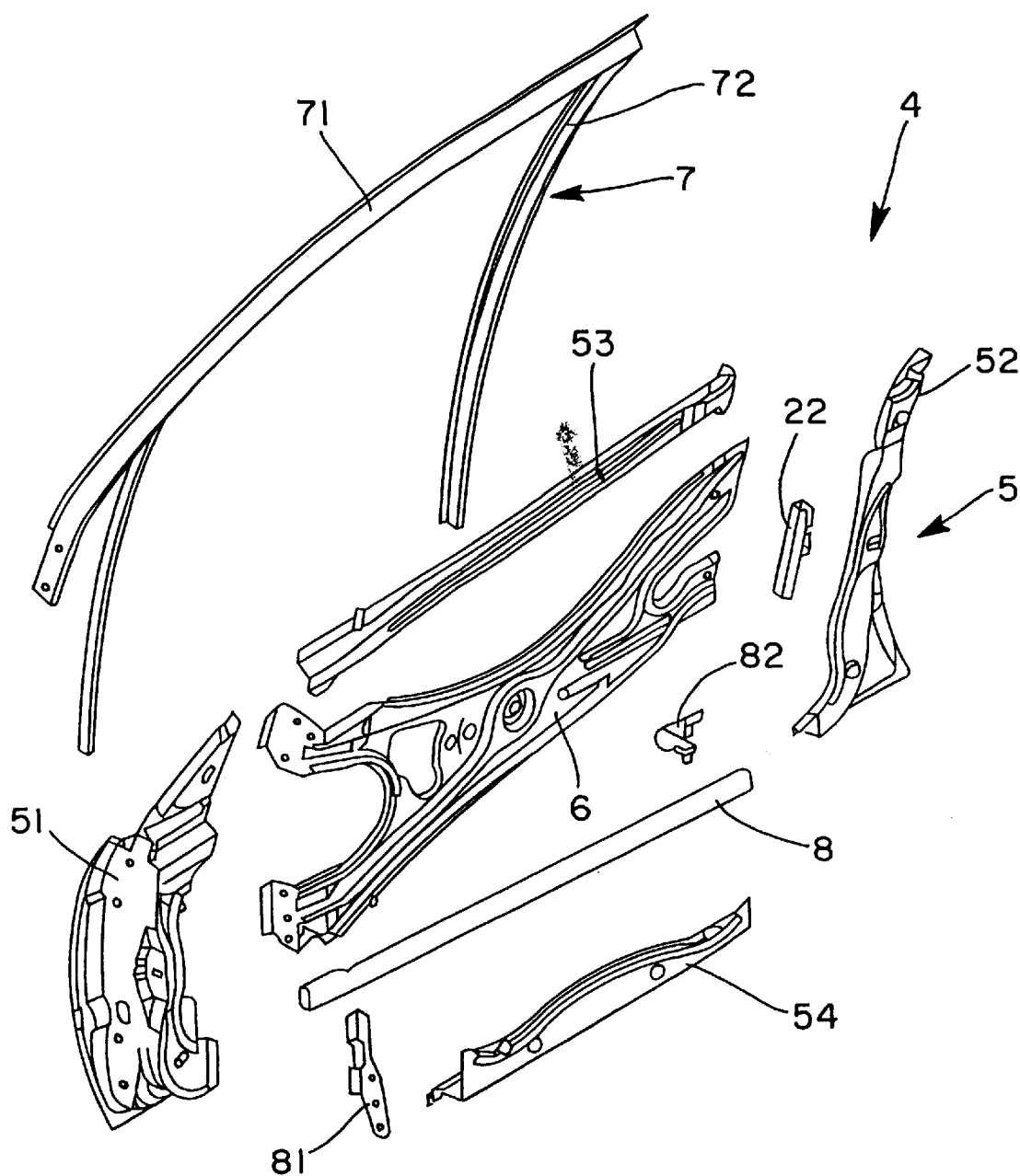
FIG. 2 is an exploded perspective view of an inner module of the vehicular door according to the invention.
Figure 3:
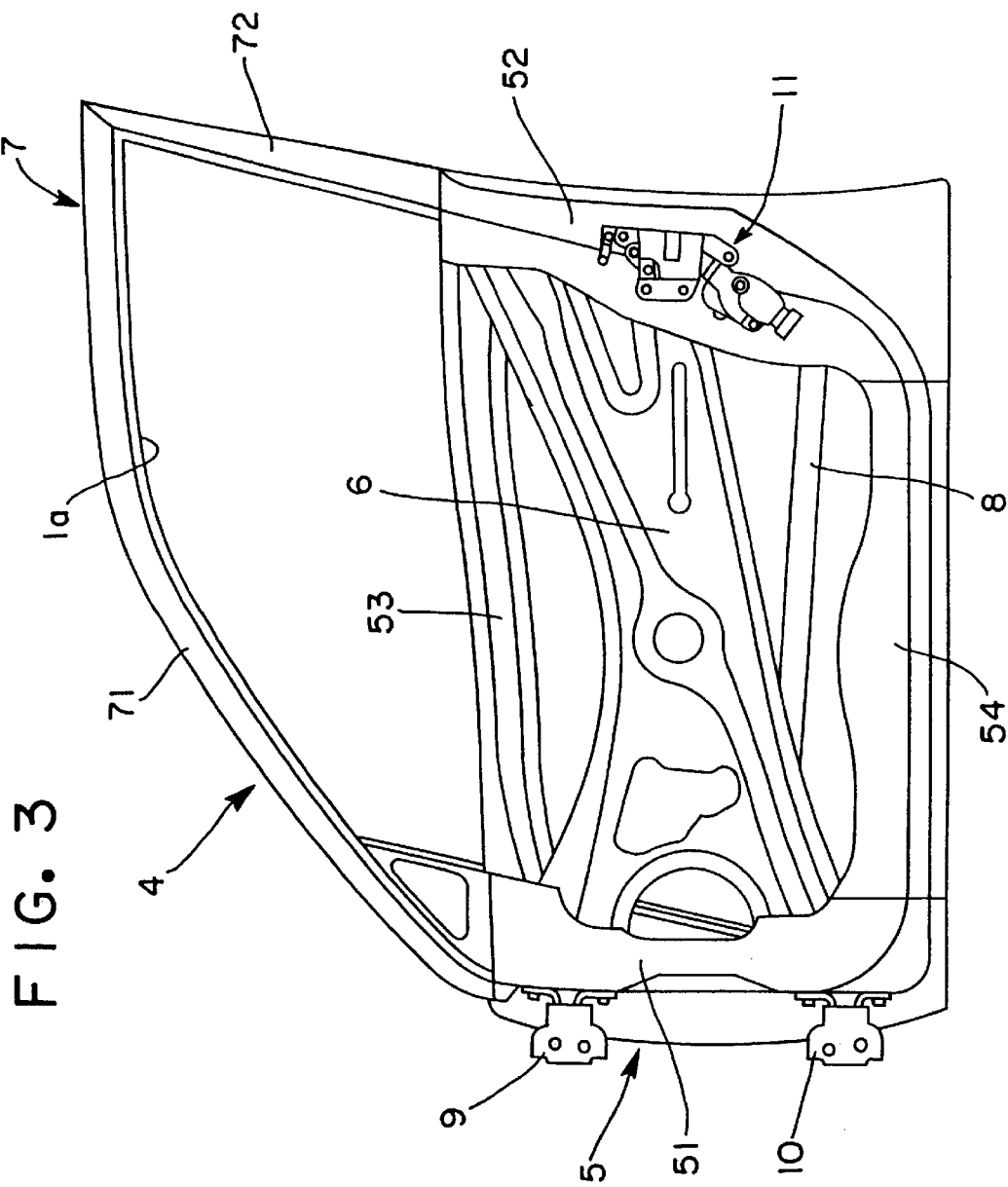
FIG. 3 is a front elevation of the inner module of the vehicular door according to the invention.

As shown in FIGS. 1 to 3, the inner module 4 includes a door inner panel 5, a base panel 6, a door frame 7 and a door impact beam 8.

The door inner panel 5 is composed of a hinge side panel 51, a lock side panel 52, an upper reinforcement 53 and a lower panel 54. The hinge side panel 51 is arranged along the front end (as located on the left-hand side in FIG. 1) of the door outer panel 2 to construct the front end wall of the car door 1. The lock side panel 52 is arranged along the rear end (as located on the right-hand side in FIG. 1) of the door outer panel 2 to construct the rear end wall of the car door 1. The upper reinforcement 53 is arranged along the upper end (or belt line portion) of the door outer panel 2 and is bonded at its front end to the hinge side panel 51 by the welding method and at its rear end to the lock side panel 52 by the welding method.

The lower panel 54 is arranged along the lower end of the door outer panel 2 and is bonded at its front end to the hinge side panel 51 by the welding method and at its rear end to the lock side panel 52 by the welding method. As a result, the door inner panel 5 presents a frame shape and fixes the front and rear edges and the lower edge of the door outer panel 2 by the hemming roll treatment to form a door internal space A, which is opened at its belt line portion, together with the door outer panel 2. The door internal space A thus opened at its belt line portion provides a space for accommodating the (not-shown) door windshield to open/close a window portion 1a which is constructed by the later-described door frame 7.

On the hinge side panel 51, on the other hand, there are mounted a pair of hinge members 9 and 10 which support the front end of the car door 1 swingably on a car body 12. On the lock side panel 52, there is mounted a door locking device 11 for holding the rear end of the car door 1 in and out of engagement with the car body 12. Thus, the car door 1 is supported to be opened from or closed into the car body 12.

The base panel 6 is bonded by the welding method to the hinge side panel 51 and the lock side panel 52 to form an X-shape and is arranged generally in parallel with the door outer panel 2 to retain the torsional rigidity of the car door 1.

The door frame 7 constructs the window portion 1a in the car door 1 and is prepared by bonding two parts, i.e., a front roof pillar member 71 having a closed sectional shape and a center pillar member 72 having a closed sectional shape by the welding method. The door frame 7 is bonded at its end on the side of the front roof pillar member 71 to the hinge side panel 51 by the welding method and at its end on the side of the center pillar member 72 to the lock side panel 52 by the welding method.

The door impact beam 8 is formed into a long pipe shape and is arranged in the door internal space A on the outer side of the car compartment of the base panel 6 and generally in parallel with the upper reinforcement 53 and the lower panel 54. The door impact beam 8 is bonded at its two ends by brackets 81 and 82 to the hinge side panel 51 and the lock side panel 52.

The base panel 6 and the door impact beam 8 are covered with a cover 24 which is adhered through a seal member 23 to the face of the door inner panel 5 on the inner side of the car compartment.

Here will be described in detail the door locking system or an essential portion of the invention.

Figure 4:
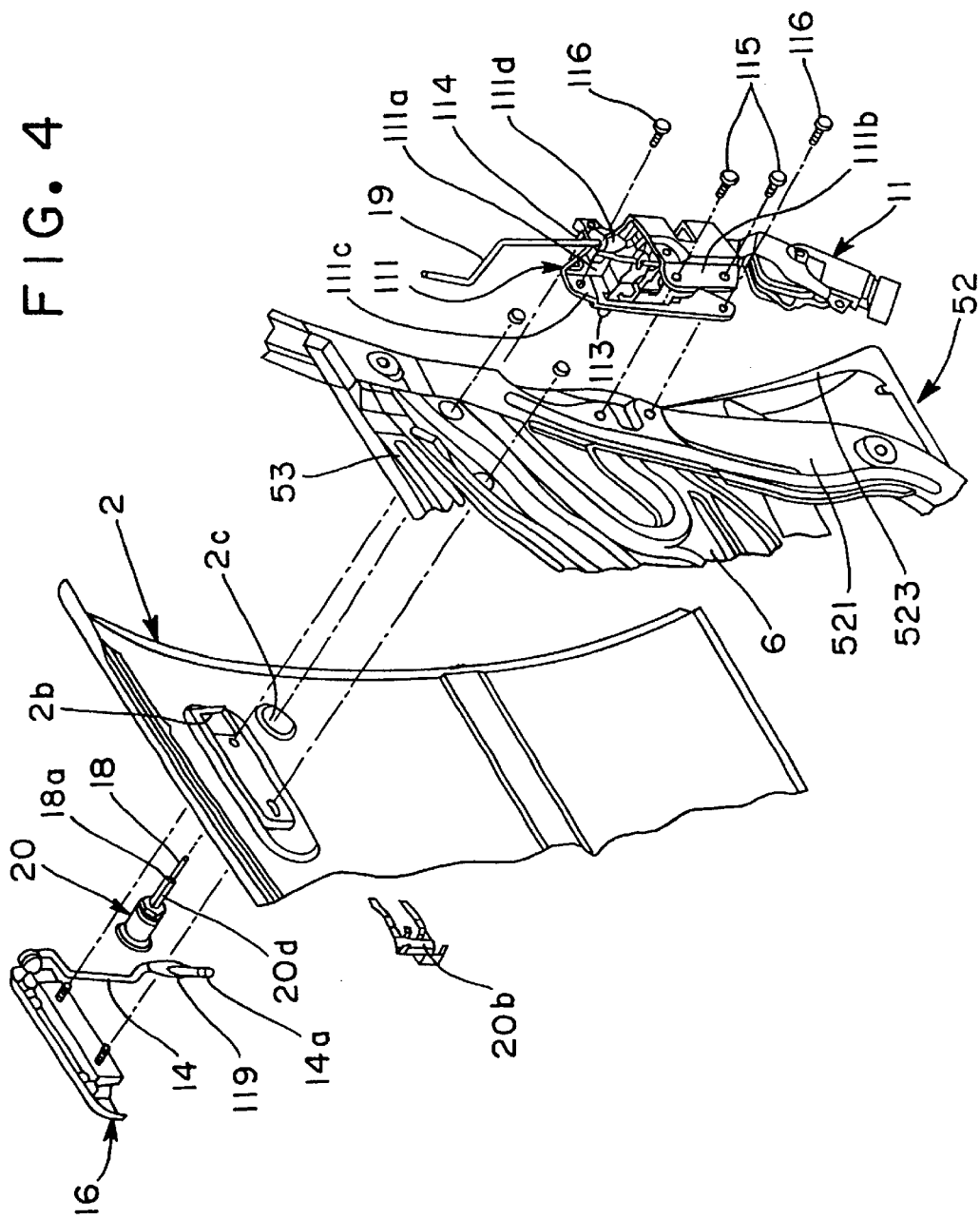
FIG. 4 is an exploded perspective view of a door locking system according to the invention.
Figure 5:
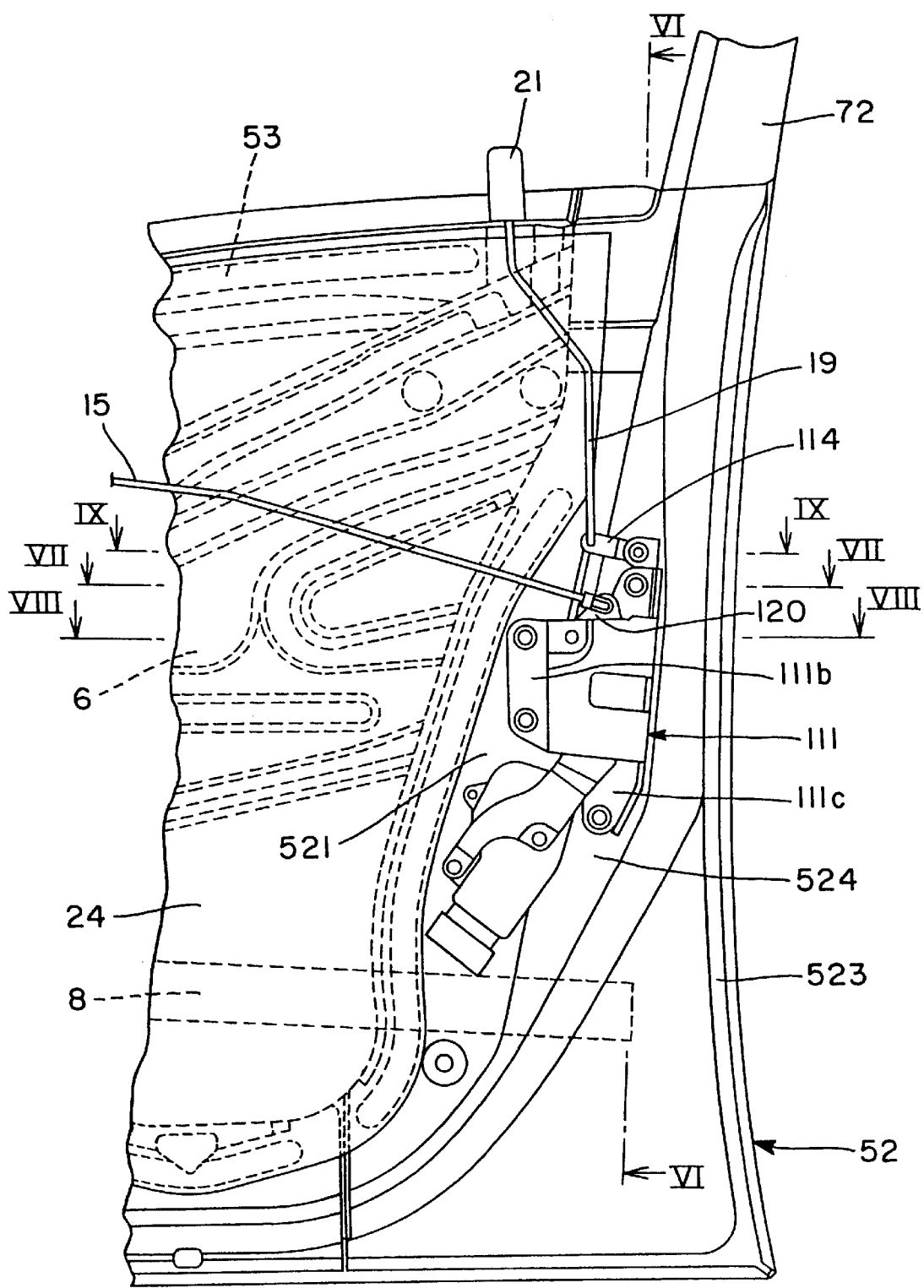
FIG. 5 is a front elevation showing a mounted state of a door locking device of the door locking system according to the invention.
Figure 6:
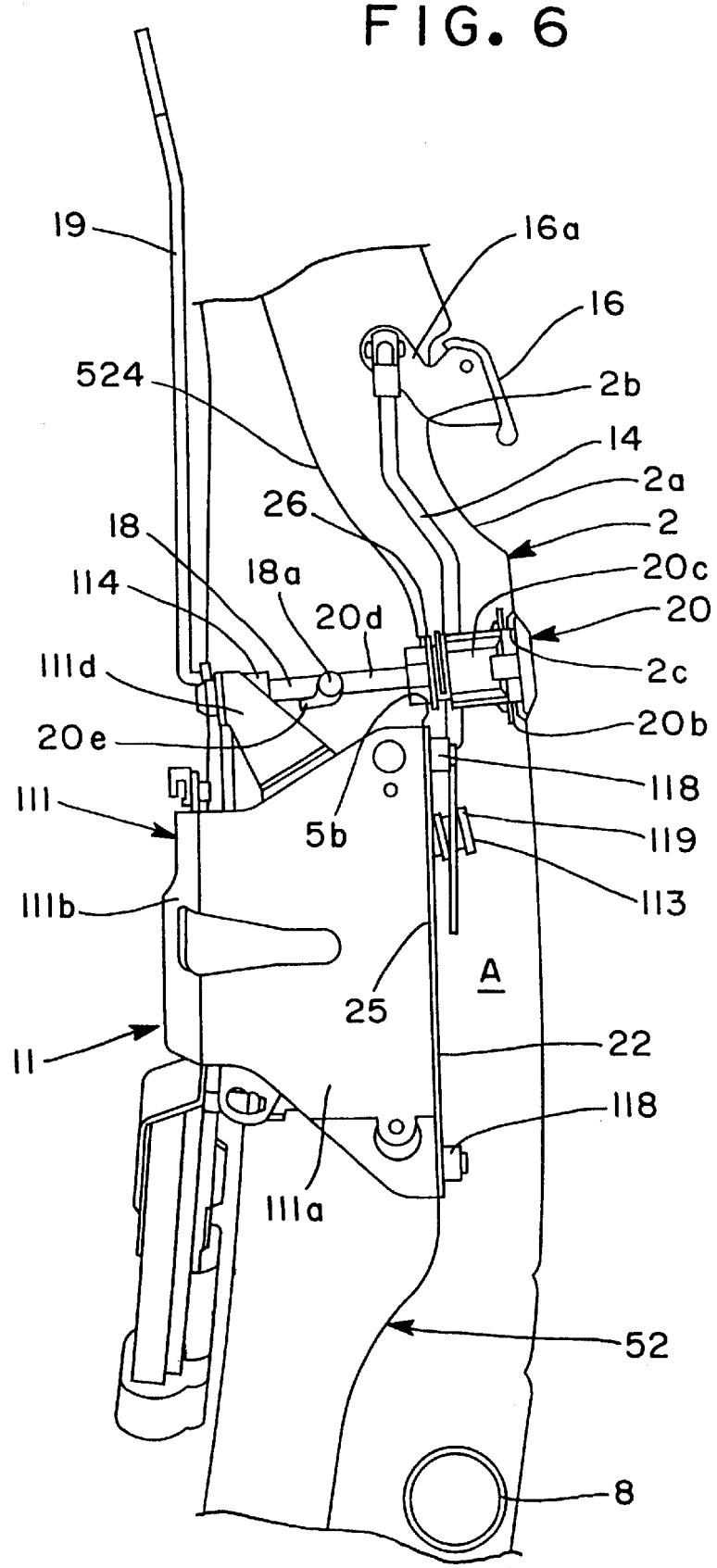
FIG. 6 is a section taken along line VI—VI of FIG. 5.

As shown in FIGS. 4 to 6, the lock side panel 52 of the door inner panel 5 is formed into an inverted L-shape composed of a horizontal wall 521 and a vertical wall 522 and is so arranged at the door outer panel 2 on the inner side of the car compartment that the horizontal wall 521 is parallel at a predetermined spacing to the door outer panel 2. The lock side panel 52 fixes the rear edge of the door outer panel 2 with a flange wall 523 which extends oppositely of the horizontal wall 521 from the vertical wall 522. At a vertical center portion of the inner face of the car compartment of the vertical wall 522, on the other hand, there is formed a recess 525 for forming a horizontal wall 524 generally in parallel with the horizontal wall 521.

The door locking device 11 is accommodated in a base plate 111, which has a generally C-shaped section composed integrally of a vertical wall 111a and mounting flange walls 111b and 111c extending from the two ends of the vertical wall 111a, and is provided with a latch mechanism 112, as well known in the art. This latch mechanism 112 is brought into and out of engagement with a (not-shown) striker on the side of the car body 12 and is actuated by the turning motion of a well-known open lever 113, as turnably supported by the base plate 111, of the door locking device 11 to come into and out of engagement with the striker thereby to establish the opened state of the car door 1 with respect to the car body 12.

Figure 7:
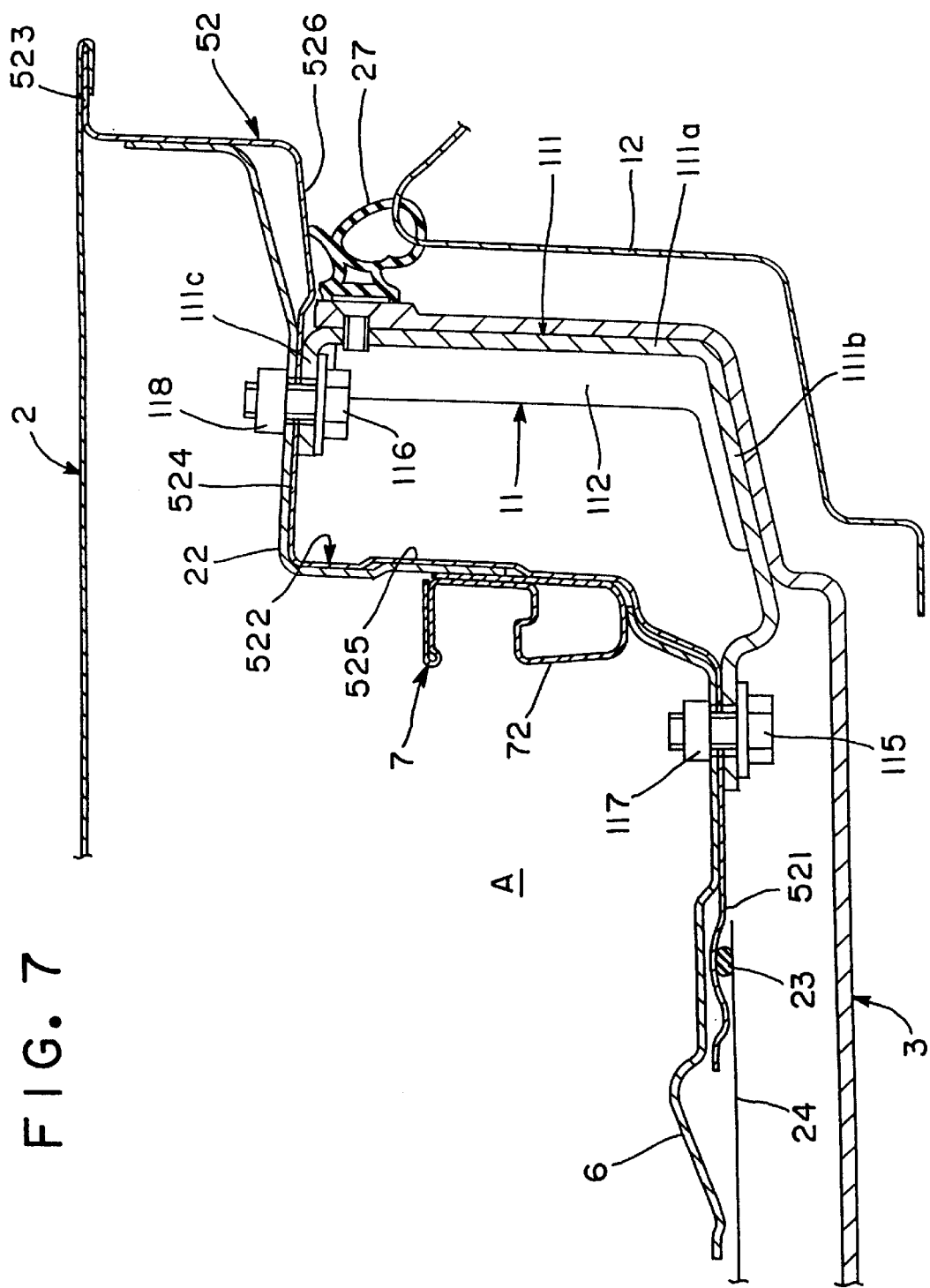
FIG. 7 is a section taken along line VII—VII of FIG. 5.

On the other hand, a key lever 114, as turnably supported by the base plate 111, of the door locking device 11 brings the open lever 113 and the latch mechanism 112 into and out of engagement with each other through a (not-shown) locking lever to establish the locked state of the car door 1. The door locking device 11 thus constructed is so inserted from the inner side of the car compartment into the recess 525 of the lock side panel 52 that the vertical wall 111a of the base plate 111 may confront the vertical wall 522 of the lock side panel 52 generally in parallel, as shown in FIG. 7, and is mounted on the face of the door inner panel 5 on the inner side of the car compartment by fastening and fixing the paired mounting flange walls 111b and 111c of the base plate 111 on the horizontal walls 521 and 524 from the inner side of the car compartment by means of bolts 115 and 116 and nuts 117 and 118.

The door locking device 11 is thus fastened and fixed from the inner side of the car compartment on the horizontal walls 521 and 524 of the lock side panel 52 so that it can be easily assembled.

In the state where the car door 1 is held in engagement with the car body 12 by the door locking device 11, on the other hand, the load in the direction to open the car door 1 is applied as a tensile load to the bolts 115 and 116 for fastening and fixing the door locking device 11 so that an advantage in strength can be achieved. Here, the portion of the lock side panel 52 to be fastened and fixed by the bolt 115 and the nut 117 is reinforced by overlying the base panel 6 which is bonded from the outer side of the car compartment (or from the side of the door internal space A) to the center pillar portion 72 of the door frame 7 by the welding method.

On the other hand, the portion to be fastened and fixed by the bolt 116 and the nut 118 is reinforced by overlying the lock reinforcement 22, as welded to the center pillar portion 72 of the door frame 7, from the outer side of the car compartment (or from the side of the door internal space A). As a result, the mounting strength of the door locking device 11 is further improved.

As shown in FIG. 6, a door outside handle 16 is connected to the open lever 113 of the door locking device 11 through a connection rod 14, and a door key cylinder 20 is connected to the key lever 114 through a connection rod 18.

Figure 8:
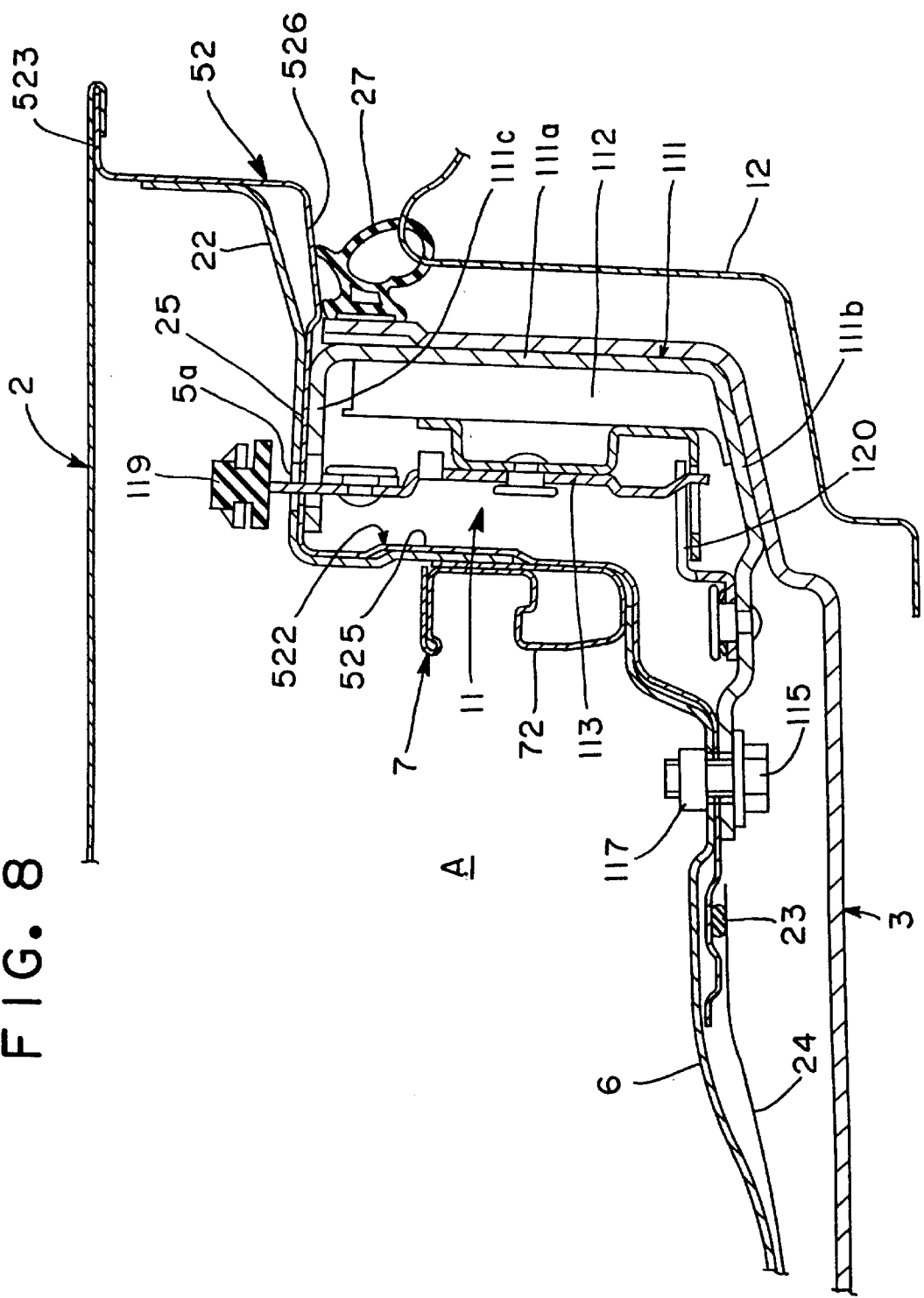
FIG. 8 is a section taken along line VIII—VIII of FIG. 5.

As shown in FIGS. 6 and 8, the door outside handle 16 is arranged in a recess 2a, which is formed in the face of the door outer panel 2 on the outer side of the car compartment, and is swingably supported by the door outer panel 2. A connection arm portion 16a of the door outside handle 16 is inserted into an opening 2b formed in the door outer panel 2 and is positioned in the door internal space A between the door outer panel 2 and the door inner panel 5. The open lever 113 of the door locking device 11 is inserted into a through hole 5a, which extends through the mounting flange wall 111c of the base plate 111, the horizontal wall 524 of the lock side panel 52 of the door inner panel 5 and a lock reinforcement 22, so far in the door internal space A between the door outer panel 2 and the door inner panel 5, and a connection clip 119 is fitted on the leading end of the open lever 113.

On the other hand, the connection rod 14 is arranged in the door internal space A between the door outer panel 2 and the door inner panel 5 and is clipped at its one end to the mounting arm portion 16a of the door outside handle 16. The connection clip 119 is fitted on the other end of the connection rod 14 through a slot 14a. By operating the door outside handle 16, therefore, the connection rod 14 can be moved downward to turn the open lever 113 of the door locking device 11.

Figure 9:
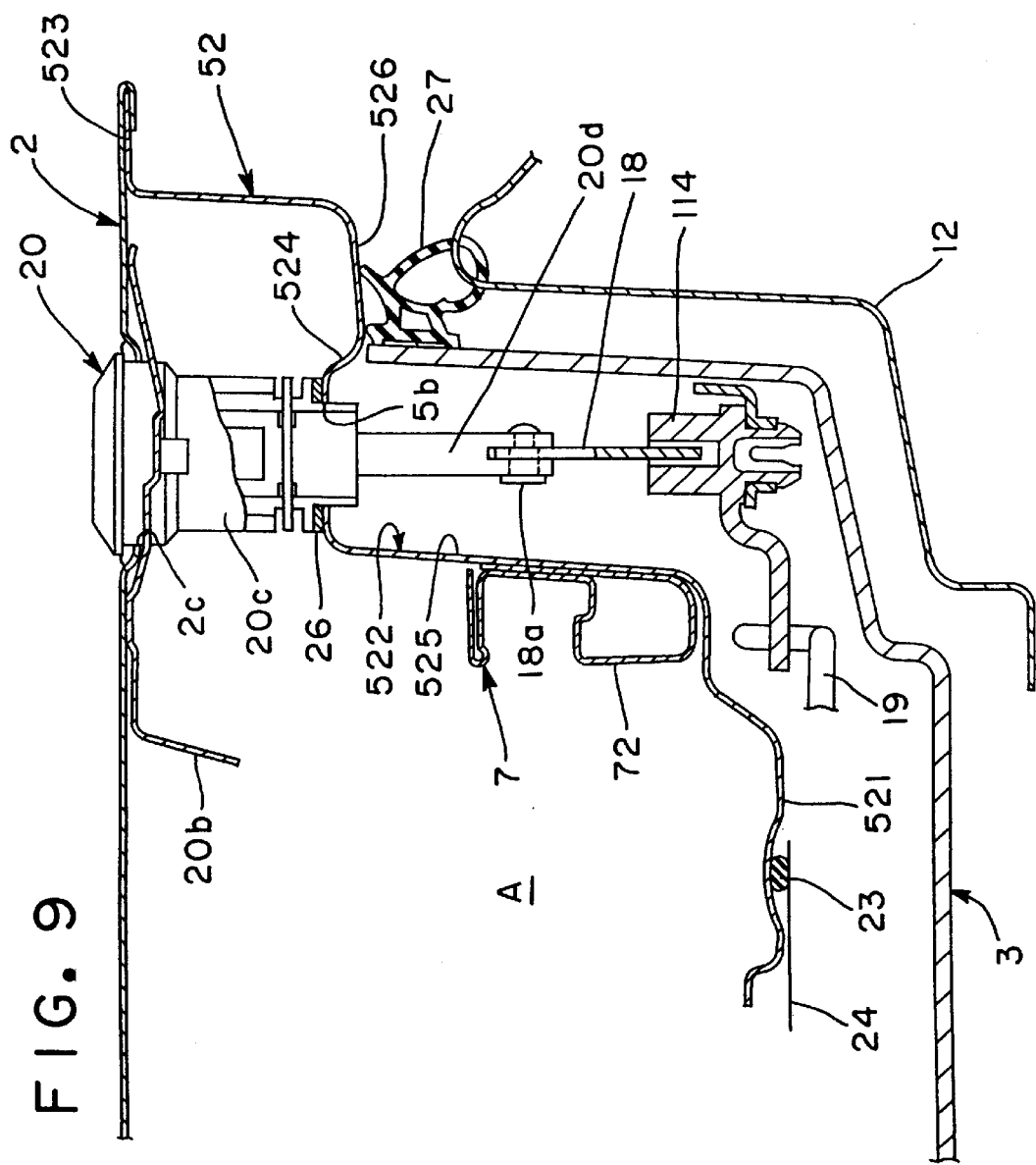
FIG. 9 is a section taken along line IX—IX of FIG. 5.
Figure 10:
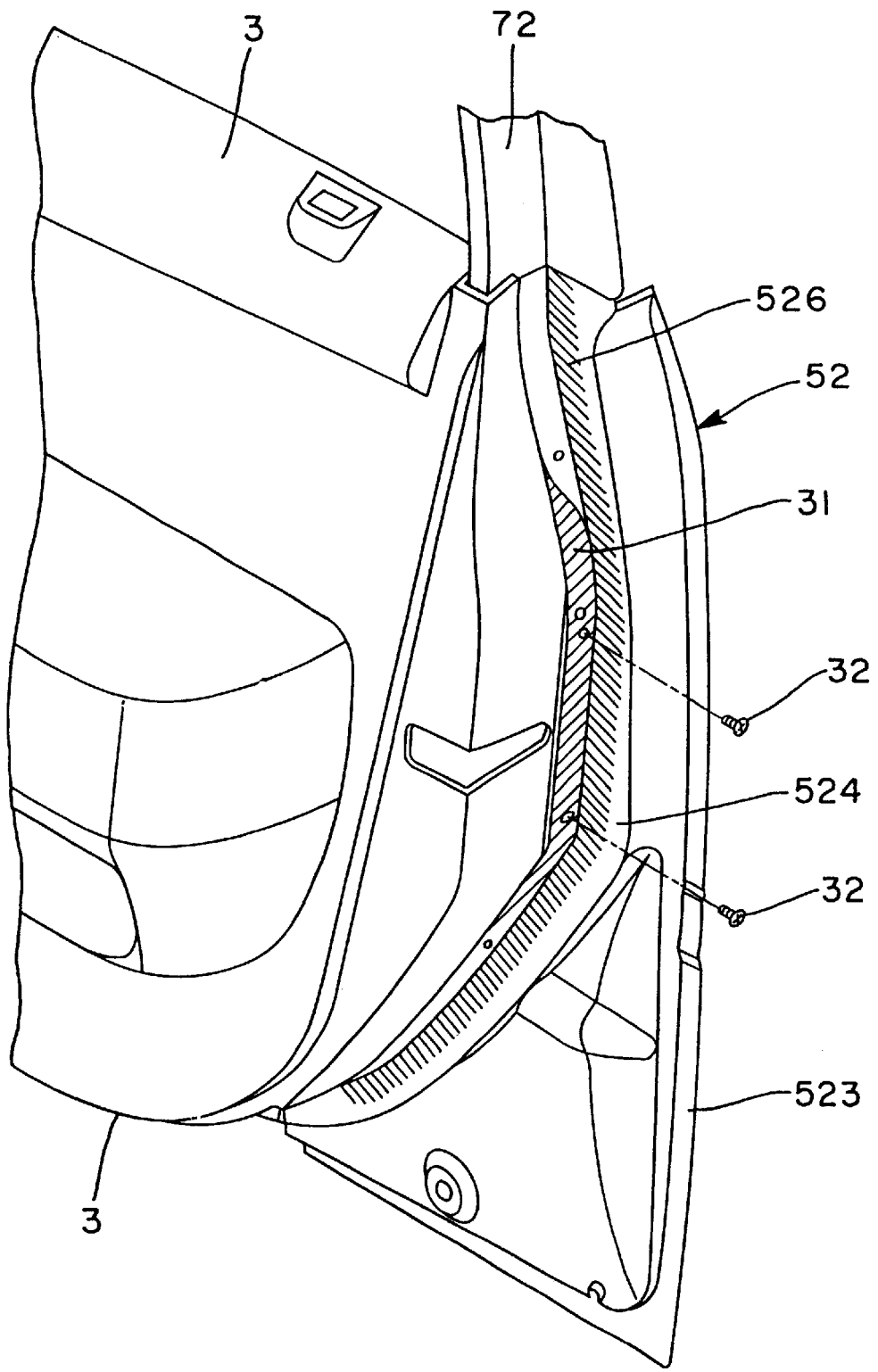
FIG. 10 is a perspective view showing a weather strip mounting position of the vehicular door according to the invention.

As shown in FIGS. 6 and 9, the door key cylinder 20 is inserted and arranged in a through hole 2c which is formed in the door outer panel 2. The door key cylinder 20 is inserted into a through hole 5b, which is formed across the door internal space A in the horizontal wall 524 of the lock side panel 52 of the door inner panel 5, and is supported in a cylinder case 20c by a support clip 20b which is fixed at its two ends on the door outer panel 2 by the door outer panel 2 and the door inner panel 5. Thus, the door key cylinder 20 is supported at its two ends by the door outer panel 2 and the door inner panel 5 so that its support can be ensured with the small number of parts. The connection rod 18 is arranged at the door inner panel 5 on the inner side of the car compartment and is rotatably connected at its one end, as located on the side of the door inner panel 5 facing the inside of the car, to a key rotary rod 20d using pin 18a at its end to be rotated by the door key cylinder 20 and inserted and fitted at its other end in the key lever 114.

The rotatable connection of the connection rod 18 with respect to that key rotary rod 20d absorbs the eccentricities of the two rods 20d and 18, and the excessive rotations of the connection rod 18 and the key rotary rod 20d are regulated by a pawl portion 20e, which is formed at the key rotary rod 20d for abutting against the connection rod 18 in the rotational direction, thereby to improve the assemblabilities of the two rods 20d and 18.

Here, the key lever 114 is of the rotary type, in which it is rotatably snapped on a bracket 111d fixed on the vertical wall 111a of the base plate 111 coaxially with the key rotary rod 20d, and is connected to the locking lever through a rocking rod 19. By operating the door key cylinder 20, therefore, the connection rod can be integrally rotated to rotate the key lever 114 of the door locking device 11.

The through holes 5a and 5b, which are formed in the horizontal wall 524 of the lock side panel 52, as the open lever 113 of the door locking device 11 is inserted into the former hole whereas the door key cylinder 20 is inserted into the latter hole, are clogged with seal members 25 and 26 which are arranged around the open lever 113 and the door key cylinder 20, thereby to provide a seal between the door internal space A and the door inner panel 5 on the inner side of the car compartment.

In the door locking system thus constructed, the door outside handle 16, to which the connection rod 14 is connected, and the door key cylinder 20, to which the connection rod 18 is connected, are assembled at first with the door outer panel 2 from the outer side of the car compartment. After this, the door locking device 11 is assembled with the door inner panel 5 from the inner side of the car compartment.

When the door locking device 11 is to be assembled, moreover, the connection clip 119 of the connection rod 14 is inserted and fitted in the open lever 113 of the door locking device 11 thereby to connect the door outside handle 16 and the open lever 113 through the connection rod 14, and the connection rod 18 is inserted and fitted on the key lever 114 of the door locking device 11 thereby to connect the door key cylinder 20 and the key lever 114 through the connection rod 18.

Thus, the door outside handle 16 and the door locking device 11 of the door key cylinder 20 are connected by the inserting and fitting operations so that they can be easily assembled.

To the open lever 113 of the door locking device 11, as shown in FIG. 5, there is connected an inside lever 120 (as shown in FIG. 8) which is turnably supported on the mounting flange wall 111b of the base plate 111. This inside lever 120 is connected through a connection rod 15, as arranged at the door inner panel 5 on the inner side of the car compartment, to the door inside handle 17 (as shown in FIG. 1) which is arranged at the door trimming 3.

Thus, the open lever 113 is also turned by operating a door inside handle 17. On the other hand, the key lever 114 of the door locking device 11 is through the connection rod 19, which is arranged at the door inner panel 5 on the inner side of the car compartment, to a lock knob 21 which is arranged at the door trimming 3, so that the key lever 114 is also turned by operating the lock knob 21.

As shown in FIGS. 7 to 9, the door locking device 11 is covered with the door trimming 3, which is supported on the face of the inner module 4 on the inner side of the car compartment, and is arranged between the door trimming 3 and the door inner panel 5 so that it is hidden from the car compartment. On the other hand, the connection rods 18 and 19, which are connected to the key lever 114 of the door locking device 11 for locking/unlocking the car door 1, are also arranged between the door trimming 3 and the door inner panel 5.

In the door internal space A for accommodating the windshield, therefore, there is arranged no part for locking/unlocking the car door 1. This improves an anti-lawful operation, because the door locking device 11 cannot be unlocked even when any unlawful tool or the like is inserted along the windshield from the outer side of the car compartment.

The door trimming 3 is screwed at its peripheral edge on the door inner panel 5. The door trimming 3 is arranged, at its end on the side of the lock side panel 52 of the door inner panel 5, along the vertical wall 522 but, at its portion accommodating the door locking device 11, along the base plate 111 of the door locking device 11, as shown in FIGS. 7 to 10, because the vertical wall 522 has the recess 525.

Moreover, the door trimming 3 has a flange portion 31, at which it is mounted by screws 32 on the vertical wall 111a of the base plate 111. Thus, the door trimming 3 is screwed on the base plate 111 of the door locking device 11 so that its deformation or the like is suppressed to prevent its interference with the car body.

On the other hand, the door inner panel 5 is provided along its front edge, lower edge and upper edge with a weather strip 27 for providing a seal between the car door 1 and the car body 12. The door inner panel 5 is provided with a seal face (e.g., a seal face 526 formed at the vertical wall 522 of the lock side panel 52 and continuing from the flange wall 524) generally parallel to the door outer panel 2 and confronting the car body 12.

The weather strip 27 contacts with this seal face and the car body 12 to provide a seal between the car door 1 and the car body 12. The weather strip 27 is fixed, on the side of the lock side panel 52 of the door inner panel 5, on the vertical wall 522 of the lock side panel 52 but is fixed, at its portion accommodating the door locking device 11, on the flange portion 31 of the door trimming 3 because the vertical wall 522 has the recess 525, so that it contacts with the seal face 526 continuing from the horizontal wall 524.

Thus, the weather strip 27 contacts with the seal face of the door inner panel 5 and the car body 12 to provide a seal between the car door 1 and the car body 12 so that it seals the two reliably without being influenced by the deformation or the like of the door trimming 3.

According to the invention, the door locking device is arranged between the door inner panel and the door trimming to support the door key cylinder on the door outer panel and the door inner panel so that the door key cylinder can be reliably supported and so that the connection between the door key cylinder and the door locking device can be effected between the door inner panel and the door trimming thereby to improve an anti-lawful operation.

According to the invention, on the other hand, the seal between the car door and the car body can be effected by bringing the weather strip into contact with the door inner panel and the car body so that it can be ensured without being influenced by the deformation or the like of the door trimming.

As many apparently widely different embodiments of the present invention can be made without departing from the spirit and scope thereof, it is to be understood that the invention is not limited to the specific embodiments thereof except as defined in the appended claims.

What is claimed is:

1. A door assembly for a vehicle comprising:

a door outer panel of a vehicle door;

a door inner panel;

a door locking device supported on one side of the door inner panel and including a locking member and an open member; and a door key cylinder fixed on the door outer panel, said door key cylinder being arranged at a side of the door inner panel opposite said one side and opposite said door locking device and extending through the door outer panel and the door inner panel so as to be associated with the locking member of said door locking device.

2. A door assembly according to claim 1, further comprising a first connection rod arranged at said door inner panel on the inner side of the vehicle compartment and connected to the locking member and the door key cylinder of said door locking device.

3. A door assembly according to claim 2, further comprising: a door outside handle adapted to be exposed to the face of said door outer panel on the outer side of the vehicle compartment and supported by said door outer panel; and a second connection rod between said door outer panel and said door inner panel and connected to said door outside handle, the open member of said door locking device being arranged through said door inner panel and being connected to said second connection rod.

4. A door assembly for a vehicle comprising:

a door outer panel of a vehicle door;

a door trimming of the vehicle door;

a door inner panel arranged between the door outer panel and the door trimming and fixed on the door outer panel and the door trimming;

a door locking device fixed on a wall of the door inner panel so as to be arranged in a space between the door inner panel and the door trimming; and a door key cylinder fixed on the door outer panel and extending through the door outer panel and the door inner panel and being connected to the door locking device.

5. A door assembly according to claim 4, further comprising first means for connecting a door outside handle and a key insertion member to the door locking device, said first means including a key cylinder case for the key insertion member supported by the door outer panel and the door inner panel and a connecting rod for connecting the door outside handle and the door locking device.

6. A door assembly according to claim 5, further comprising second means for connecting an operation member in the key cylinder case to the door locking device and connecting the connecting rod for the door outside handle to the door locking device.

7. A door assembly according to claim 6, wherein the door locking device has a base plate which is secured to a door lock side panel so that the first connecting means is connectable to the second connecting means in said space between said door inner panel and said door outer panel by a hand operation.

8. A door locking assembly for a vehicle comprising:

a door locking device adapted to be fixed on one side of a door inner panel of a vehicle door and including a locking member and an open member; and a door key cylinder adapted to be fixed on the door outer panel of said vehicle door, said door key cylinder being adapted to be arranged at a side of the door inner panel opposite said one side, the door key cylinder being adapted to be arranged opposite said door locking device and extending through the door outer panel and the door inner panel so as to be associated with the locking member of said door locking device, said door locking device comprising a base plate having a generally C-shaped section including a vertical wall and two mounting flange walls extending from both ends of said vertical wall, both of said mounting flange walls being attachable to said door inner panel.

* * * * *